United States Patent [19]

Miyazaki et al.

[11] Patent Number: 4,634,457

[45] Date of Patent: Jan. 6, 1987

[54] AIR CLEANER FOR ENGINE

[75] Inventors: Hiroshi Miyazaki, Musashimurayama; Toshiharu Sawada, Fuchu; Kazuo Nakajima, Tokorozawa, all of Japan

[73] Assignee: Kamatsu Zenoah Co., Tokyo, Japan

[21] Appl. No.: 760,310

[22] Filed: Jul. 29, 1985

[30] Foreign Application Priority Data

Aug. 3, 1984 [JP] Japan .......................... 59-119694[U]

[51] Int. Cl.$^4$ .............................................. B01D 25/04

[52] U.S. Cl. .................................... 55/276; 55/385 B; 55/DIG. 28; 123/198 E; 181/204

[58] Field of Search ................. 30/381, 382, 383, 384; 55/385 R, 385 A, 385 B, DIG. 28, 276; 123/198 E; 181/204; 261/64 E

[56] References Cited

U.S. PATENT DOCUMENTS

| | | | |
|---|---|---|---|
| 2,586,935 | 2/1952 | Gerson | 55/276 |
| 2,764,142 | 9/1956 | McMullen | 55/DIG. 28 X |
| 2,904,129 | 9/1959 | McMichael | 55/276 |
| 2,943,699 | 7/1960 | Thornburgh | 55/276 |
| 2,954,091 | 9/1960 | McMichael | 55/276 |
| 3,927,656 | 12/1975 | Reed et al. | 55/DIG. 28 X |
| 3,939,231 | 2/1976 | Steele et al. | 261/64 E |
| 4,183,344 | 1/1980 | Kirchweger et al. | 123/198 E |
| 4,548,169 | 10/1985 | Nagashima | 123/198 E X |

*Primary Examiner*—Charles Hart

*Attorney, Agent, or Firm*—Thompson, Birch et al.

[57] ABSTRACT

An air cleaner for an engine is provided according to the invention. Said air cleaner comprises openings for communicating with atmosphere provided along a peripheral portion surrounding a suction chamber communicating with a suction port of a carburetor, a filter to cover said openings, a suction path formed along the inside of said openings, a partition wall provided to separate said suction path and said suction chamber, and a communicating path to provide communication between said suction path and said suction chamber so that the suction sound of the engine is prevented by said partition wall from propagating directly to atmosphere and reduced due to interference caused when passing through the long suction path which is located inside the filter, without reducing the area of the path through which suction air passes.

4 Claims, 2 Drawing Figures

AIR CLEANER FOR ENGINE

BACKGROUND OF THE INVENTION

1. Field of the Invention

The present invention relates to an air cleaner provided in communication with a suction port of a carburetor of an engine to remove dust from suction air.

2. Description of the Prior Art

In a conventional air cleaner, particularly a conventional air cleaner for a portable 2-cycle engine such as a chain saw, the suction sound of the engine has been discharged through a suction port of a carburetor and transmitted to the outside through a filter to cause a loud noise. The area of an opening which communicates to atmosphere may be made small to reduce the suction sound of the engine due to the buffer action of the small opening. However, the suction sound caused by intake air passing through said small opening is increased in contrast with that, and the engine is exposed to back pressure so that the performance of the engine is lowered.

SUMMARY OF THE INVENTION

An object of the present invention is to provide an air cleaner for an engine, which is so constituted that the suction sound of the engine is prevented from propagating directly to atmosphere.

Another object of the present invention is to provide such quiet air cleaner without reducing the area of a path through which intake air passes.

In order to accomplish the objects and advantages mentioned in the above, there is provided according to the present invention an air cleaner for an engine, comprising openings for communicating with atmosphere provided along a peripheral portion surrounding a suction chamber communicating with a suction port of a carburetor, a filter to cover said openings, a suction path formed along the inside of said openings, a partition wall provided to separate said suction path and said suction chamber, and a communicating path to provide communication between said suction path and said suction chamber so that the suction sound of the engine is prevented by said partition wall from propagating directly to atmosphere and reduced due to interference caused when passing through the long suction path which is located inside the filter, without reducing the area of a path through which suction air passes.

DETAILED DESCRIPTION OF THE EMBODIMENT

Figure 1:
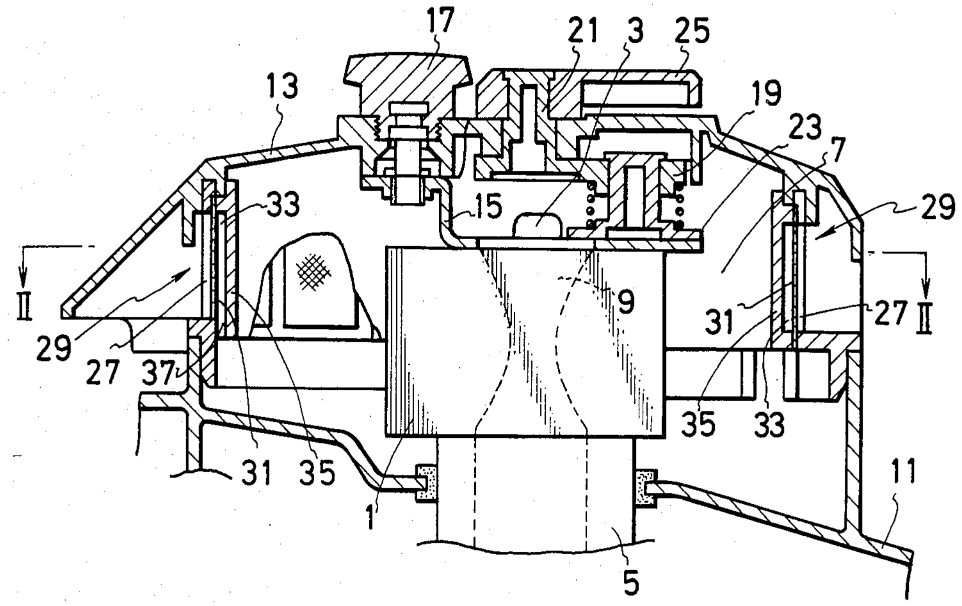
FIG. 1 is a cross sectional side view showing one embodiment of the present invention.
Figure 2:
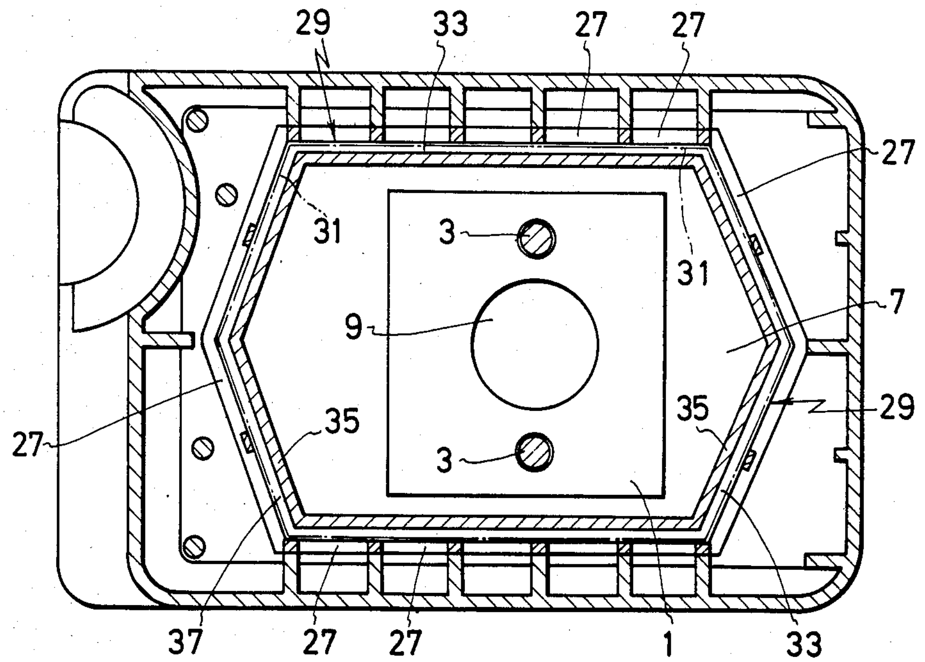
FIG. 2 is a cross sectional plan view along the line II—II shown in FIG. 1.

The detail of the present invention is now described with reference to accompanied figures. In the figures, a carburetor 1 is fixed with bolts 3 to an engine (not shown) via a heat insulating body 5. A suction chamber 7 communicates with a suction port 9 of the carburetor 1, and is surrounded and formed by a main body casing 11 for enclosing the engine, and an air cleaner 13. A supporting plate 15 is fastened to the carburetor 1 by the bolts 3. A screw 17 is screwed into the supporting plate 15 to fix the air cleaner 13. An arm 19 is pivotably fixed by an axis 21 inside the air cleaner 13. A valve 23 is supported by the arm 19 to close and open the suction port 9 according to the pivoting operation of the arm 19. A lever 25 is fixed at the outer end of an axis 21. Opening portions 27 are provided along the peripheral portion 29 of the suction chamber 7 to communicate with atmosphere. A filter 31 is made of fabric to cover the opening portions 27. A suction path 33 provided along the inside of opening portions 29, said suction path 33 being separated from the suction chamber 7 by a partition wall 35. A communicating path 37 provides communication between the suction path 33 and the suction chamber 9.

In the embodiment mentioned in the above, atmosphere is drawn from opening portions 27, passed through the filter 31 and the suction path 33, introduced into the suction chamber 7 from the communicating path 37, and sucked into the carburetor 1 through the suction port 9. The suction sound of the engine is prevented by the partition wall 35 from propagating directly to atmosphere. Since the suction path 33 is elongated and bent, the interference of the suction sound of the engine occurs when the sound passes through the suction path 33 so that the sound is reduced.

According to the constitution mentioned in the above of the present invention, the suction sound of the engine discharged from the suction port of the carburetor is effectively reduced without reducing the area of the filter and the area of the path.

It shall be understood that the present invention is not limited to the embodiment described in the above, and many modifications may be made without departing from the scope of the present invention.

What is claimed is:

1. An air cleaner for air being admitted to the suction port of a carburetor of a gasoline engine, comprising:

a housing including a cover cooperating with a portion of said engine to define a suction chamber, said carburetor being enclosed within said chamber and having its suction port communicating therewith, openings in said housing leading from said suction chamber to the surrounding atmosphere, a fabric filter positioned at said openings to filter air passing therethrough, wall means spaced inwardly from said filter, said wall means cooperating with said filter to define a first passageway which surrounds said carburetor and which is isolated from said suction chamber, and a second passageway connecting said first passageway to said suction chamber, the arrangement of said passageways being such that air admitted to and suction sounds emitted from said suction port are caused to follow a circuitous path between said openings and said suction port.

2. An air cleaner for an engine according to claim 1 further comprising a valve mounted on an arm for pivotal movement about an axis, said valve being enclosed within said air cleaner and being operative to open and close said suction port of said carburetor.

3. An air cleaner according to claim 1, further comprising a supporting plate through which said air cleaner is fixed to said carburetor.

4. An air cleaner according to claim 1, wherein said carburetor is fixed byfixing means to an engine through a heat insulating material.

* * * * *